United States Patent

Wawrzyniak

[11] 4,043,252
[45] Aug. 23, 1977

[54] CYLINDER LOCK STRUCTURE

[76] Inventor: Walter W. Wawrzyniak, 39230 Gary, Mount Clemens, Mich. 48043

[21] Appl. No.: 662,350

[22] Filed: Mar. 1, 1976

[51] Int. Cl.$^2$ .......................................... F15B 15/26
[52] U.S. Cl. .......................................... 92/24; 92/27; 188/67
[58] Field of Search .................. 92/27, 28, 23, 24; 188/67

[56] References Cited

U.S. PATENT DOCUMENTS

| 3,177,779 | 4/1965 | Dobrikin | 92/27 |
| 3,208,357 | 9/1965 | Allen | 92/27 |

Primary Examiner—Martin P. Schwadron
Assistant Examiner—Abraham Hershkovitz
Attorney, Agent, or Firm—Whittemore, Hulbert & Belknap

[57] ABSTRACT

Structure for locking a cylinder piston or the like in one limiting position thereof including a housing, a wedge member secured to the piston for reciprocation therewith mounted within the housing and having a cam surface thereon, and a locking piston positioned within the housing for reciprocal movement transversely of the wedge member also having a cam surface thereon engageable with the cam surface of the wedge member in one position thereof to secure the cylinder piston in the one limiting position. The camming surfaces have a surface area and a locking angle with respect to the cylinder piston to provide improved locking force on the cylinder piston and prevent backup of the cylinder piston on pressure drop or failure to the locking piston.

11 Claims, 5 Drawing Figures

CYLINDER LOCK STRUCTURE

BACKGROUND OF THE INVENTION

1. Field of the Invention

The invention relates to piston and cylinder structures and refers more specifically to structure for releasably locking a piston in one limiting position thereof.

2. Description of the Prior Art

In the past, piston and cylinder structures usually have not been equipped with means for locking the piston in a particular position thereof. Wherein structure for locking a piston in a particular position thereof has in the past been provided, it has generally been in the form of a separate locking member actuated by a separate piston and cylinder structure. Such separate piston and cylinder structure has in the past often been difficult to locate and support without interference with associated structure.

SUMMARY OF THE INVENTION

The invention comprises a housing adapted to be secured to one end of piston and cylinder structure, a wedge member mounted in the housing for reciprocal movement on the axis of and connected to the cylinder piston having a transversely extending slot therein, one side of which forms a cam surface, and a locking piston mounted in the housing member for reciprocal movement transversely of the wedge member, including a cam surface thereon movable within the slot in the wedge member and engageable with the cam surface on the wedge member to lock the wedge member in a predetermined position axially of the cylinder piston. The locking piston includes a transversely extending recess in one side thereof permitting reciprocal movement of the wedge member with the locking piston in a retracted position.

Structure is provided between the housing and both the wedge member and locking piston for permitting relatively perpendicular axial movement of the wedge member and locking piston and for preventing angular movement thereof about their own axis, to insure proper meshing of their respective cam surfaces.

The cam surfaces are at a locking angle with respect to the direction of movement of the cylinder piston in the cylinder to prevent backing off of the cylinder piston on drop or failure of pressure to the cylinder piston with the cam surfaces in engagement. Also, the cam surfaces are of an extent to provide greater locking pressure than the line contact available with some known locking devices.

The piston locking structure of the invention may be secured to either end of double ended piston and cylinder structure or may be secured to the front end of single ended piston and cylinder structure. Further, the piston locking structure of the invention may be fluid actuated, such as by air or hydraulic pressure, in one or both directions or may be hydraulically actuated in one direction and mechanically returned, such as a spring, in the other direction.

Structure may also be provided where necessary to prevent the cylinder piston from rotating relative to the cylinder to ensure alignment of the cam surfaces. Also, actuation of the cylinder piston and locking piston may be separately sequenced or may be partly sequenced together in accordance with the invention.

DESCRIPTION OF THE PREFERRED EMBODIMENT

Figure 1:
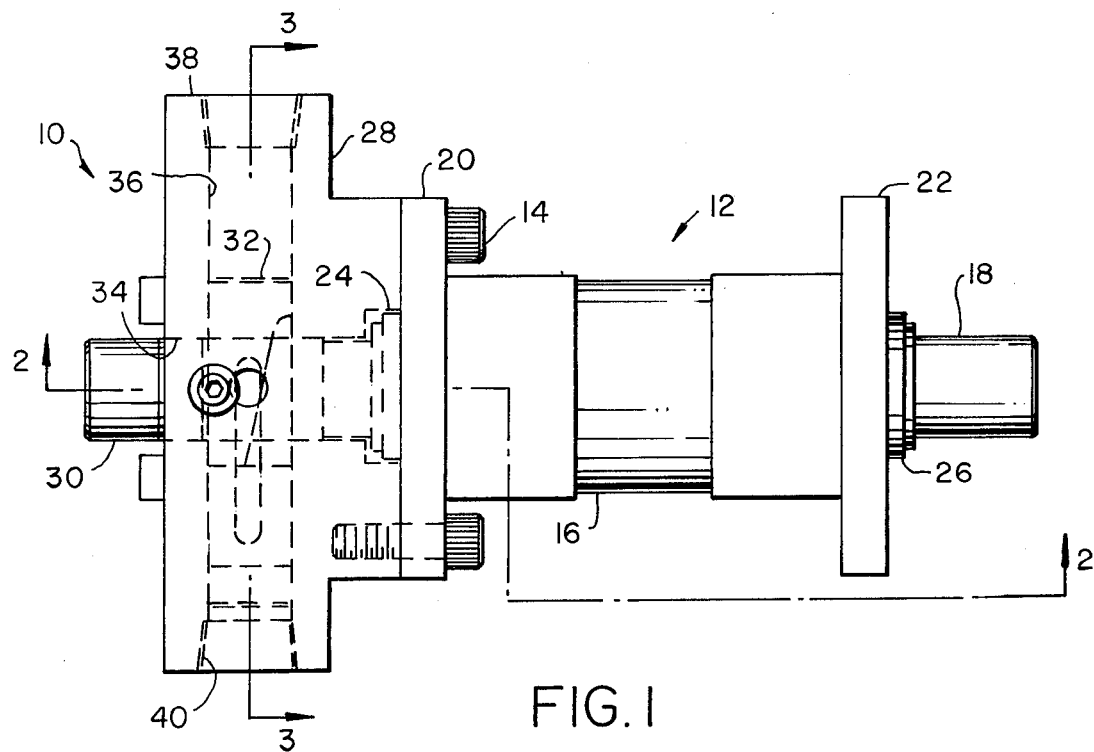
FIG. 1 is a top view of double ended piston and cylinder structure having piston locking structure constructed in accordance with the invention in assembly therewith.

As shown in FIG. 1, the piston locking structure 10 of the invention is secured to double ended piston and cylinder structure 12 by convenient means such as bolts 14.

The piston and cylinder structure 12 includes the hydraulic cylinder 16 having a cylinder piston 18 reciprocal therein. The cylinder piston 18 extends through both end plates 20 and 22 of the piston and cylinder structure and the seals 24 and 26 provided between the end plates 20 and 22 and the cylinder piston 18. The piston and cylinder structure 12 is a known double ended hydraulic piston and cylinder structure.

The piston locking structure 10 includes a housing 28, a wedge member 30, and a locking piston 32.

The housing 28 is provided with a passage 34 extending therethrough axially of the cylinder piston 18 for receiving the wedge member 30 for reciprocation therein axially of the wedge member and cylinder piston. The housing 28 further includes the passage 36 therethrough in which the locking piston 32 is positioned for reciprocation transversely of the wedge member 30. The passage 36 is adapted at the opposite ends 38 and 40 to receive actuating fluid fittings, not shown, through which actuating fluid may be passed into and out of housing 28 to cause forced reciprocation of the locking piston 32 within the passage 36 under predetermined pressure.

Figure 4:
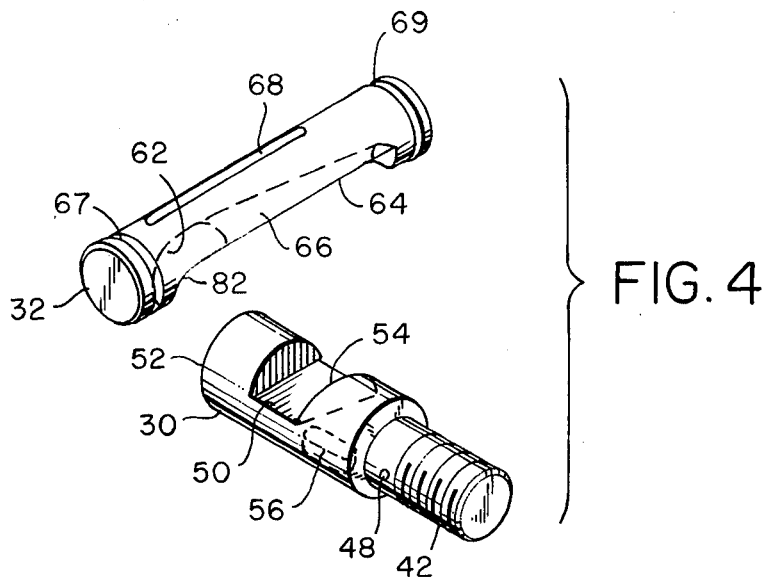
FIG. 4 is an exploded isometric view of the locking piston and wedge member of the piston locking structure illustrated in FIGS. 1-3.

The wedge member 30, as best shown in FIG. 4, is generally cylindrical and is provided with a threaded, reduced diameter end 42 adapted to threadedly engage the end 44 of the piston 18 to which it is secured for axial reciprocation by pin 46 extending through opening 48 which extends radially through the reduced diameter end 42 of the wedge member. The wedge member 30 is further provided with a transverse slot 50 extending across the larger diameter end 52 thereof having one side 54 which is inclined to the longitudinal axis of the wedge member to form a cam surface for engagement with a mating cam surface on the locking piston 32, as will be seen subsequently.

Figure 2:
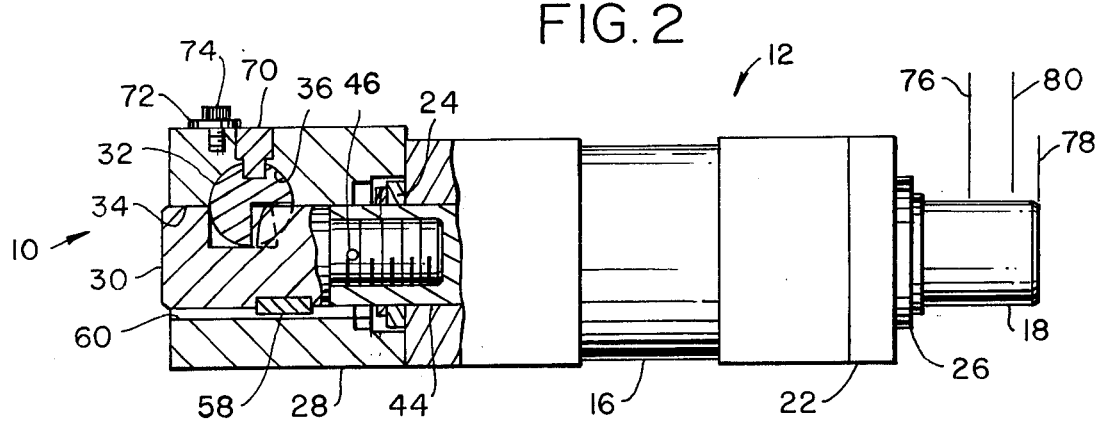
FIG. 2 is a partial section view of the structure illustrated in FIG. 1, taken substantially on the line 2—2 in FIG. 1.

An axially extending slot 56 is provided in the side of the wedge member 30 opposite the transverse slot 50 for receiving a key 58 shown best in FIG. 2. The key 58 reciprocates within a keyway 60 provided in the passage 34 of the housing 28 on reciprocation of the wedge member 30 in the passage 34. The key 58 and keyway 60 permit axial reciprocation of the wedge member 30 but prevent rotation or angular movement thereof about its longitudinal axis, whereby the cam surface 54 is maintained in a desired position relative to the locking piston 32.

Figure 3:
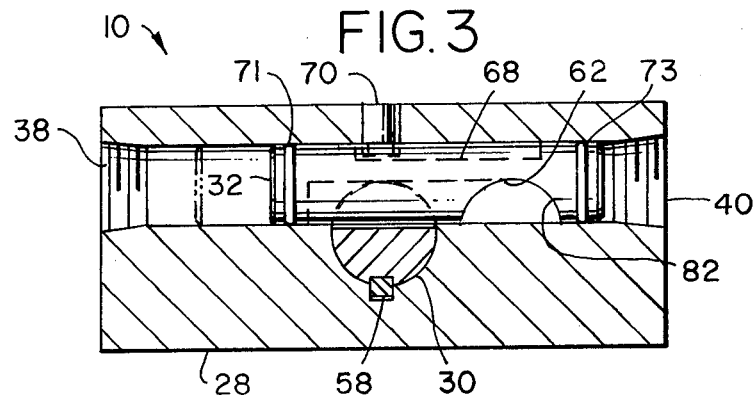
FIG. 3 is a section view of the structure illustrated in FIG. 1, taken substantially on the line 3—3 in FIG. 1.

The locking piston 32, again as shown best in FIG. 4, includes a transversely extending slot 62 having a semicircular cross section, shown best in FIG. 3. The slot 62 intersects a longitudinally extending recess 64 in the piston providing a cam surface 66 extending obliquely to the longitudinal axis of the locking piston. Annular grooves 67 and 69 are provided at the opposite ends of locking piston 32 in which sealing rings 71 and 73 are positioned.

The cam surface 66 engages the cam surface 54 with the piston 18 in one limiting position thereof and the locking piston in an engaged position. With the locking piston 32 in a retracting position, the wedge member 30 is permitted to reciprocate axially through the slot 62 in the locking piston 32. The side 82 of slot 62 establishes the retracted position of piston 32, while the limiting position of piston 18 establishes the engaged position of the piston 32.

A longitudinally extending slot 68 is provided in the locking piston opposite the slot 62. The slot 68 receives a pin 70 positioned and held in place in the housing 28 by means of the washer 72 and nut 74, as shown best in FIG. 2. The slot 68 and pin 70 permit axial reciprocation of locking piston 32, while preventing angular movement or rotation thereof about its own axis.

In overall operation of the piston locking structure 10 illustrated in FIGS. 1-4, the housing 28 is secured to the rear plate 20 of the double ended piston and cylinder structure 12 by means of the bolts 14. The wedge member 30 is secured to the end 44 of the piston 18 by the pin 46 after the locking piston 32 is placed in the passage 36. The wedge member 30 and the locking cylinder 32 are at this time fixed against rotation about their longitudinal axis but permitted axial movement by means of the key and slot 58 and 60 and the pin and slot 70 and 68, respectively. Actuating fluid is connected to the housing 28 through fittings, not shown, at the ends 38 and 40 of the passage 36 in the housing 28.

With such structure, with the actuating fluid positioning the locking piston 32 in an up position, as shown in FIG. 1, which is a left limiting position, as shown in FIG. 3, the wedge member 28 and the piston 18 may be axially reciprocated, as desired, between the stroke limits thereof between lines 76 and 78, as shown in FIG. 2. When it is desired to lock the piston 18 in an extended position, the piston 18 is moved to a limiting position some place between the lines 78 and 80, which is the locking range of the piston 18, which may be determined, for example, by the position of a workpiece which the piston 18 or something attached to the piston 18 is engaged with. The locking piston 32 is then caused to move down in FIG. 1 or to the right in FIG. 3, as shown, to engage the cam surface 54 on the wedge member 30 and cam surface 66 on the piston 32. At this time, the piston 18 is prevented from returning to the left in FIG. 1. Further, the pressure on the locking piston 32 provided by fluid through the end 38 of the housing 28 in passage 36 will hold the piston 18 in a limiting rightward position against unusually high pressures, since the area of the cam surfaces 54 and 66 are relatively large in comparison to line contact of for example rotating arcuate cam surfaces. Should the pressure in passage 36 drop or fail, the piston 18 will be maintained in position, since the angle the cam surfaces make with the direction of movement of the cylinder piston 18 is a locking angle.

When it is desired to unlock the piston 18 so that it may be moved to the left again, the actuating fluid pressure is removed from the passage 36 through end 38 of housing 28 and increased in the other end of the passage 36 through end 40 of housing 28 to cause the piston to move up, in FIG. 1, and to the left, in FIG. 3. At the limiting retracted position of the locking piston 32, the wedge member 30 is aligned with the slot 62 and may be reciprocated axially to provide the cylinder piston 18 with its full range of movement between the lines 76 and 78, as shown best in FIG. 2.

Figure 5:
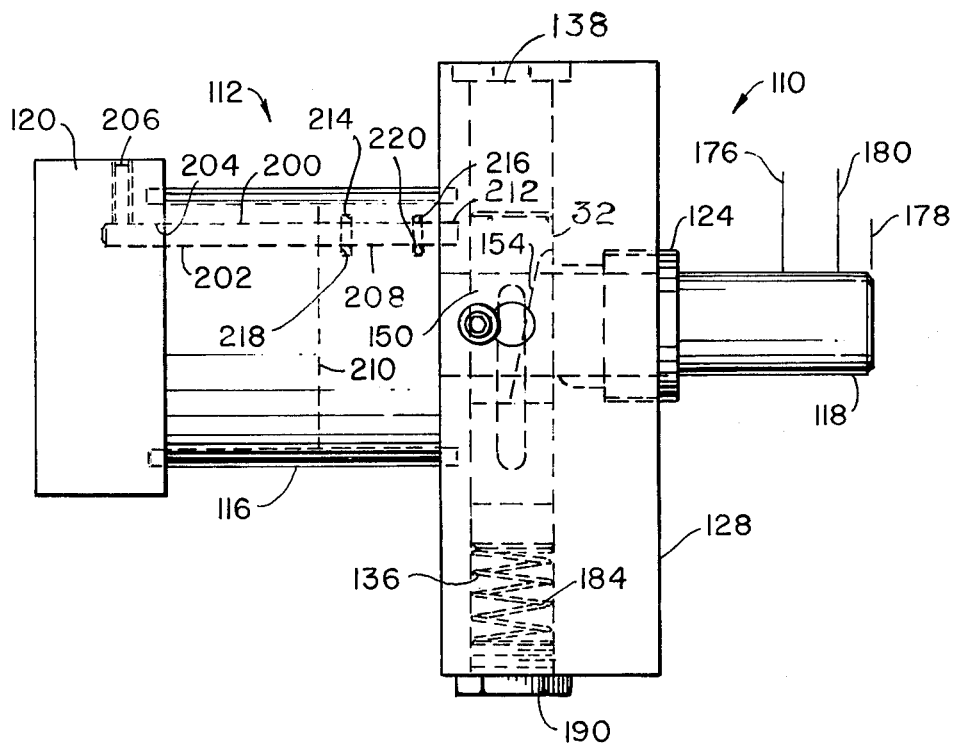
FIG. 5 is a top view of single ended piston and cylinder structure illustrating the piston locking structure of the invention in assembly therewith in a different location and showing mechanical return structure for the locking piston and structure for preventing rotation of the cylinder piston with respect to the cylinder.

The embodiment of the piston locking structure 110 of the invention shown in FIG. 5 is similar to the embodiment 10 shown in FIGS. 1-4. However, the locking structure 110 is secured to the single ended piston and cylinder structure 112 by convenient means, not shown, so that the housing member 128 forms the front plate of the piston and cylinder structure 112. Also, the slot 158 having the cam surface 154 is provided in the piston 118.

In addition, the structure illustrated in FIG. 5 includes the anti-rotate structure 200. Anti-rotate structure 200 includes the pin 202 secured in recess 204 in back end plate 120 by set screw 206. Pin 202 passes through bore 208 in the enlarged diameter portion 210 of piston 118 and into recess 212 in housing member 128. Sealing rings 214 and 216 are placed in annular grooves 218 and 220 in bore 208 to seal between pin 202 and portion 210 of piston 118.

In operation, again the piston 118 is reciprocal between the lines 176 and 178 and may be locked in a rightward position, as shown in FIG. 5, between the lines 180 and 178. Downward movement of locking piston 32 is under fluid pressure through end 138 of housing 128, while return movement of the locking piston is under mechanical force from bias spring 184 secured in passage 136 in housing 128 by plug 190. Rotation of the cylinder piston 118 with respect to the cylinder 116 is prevented by the anti-rotation structure 200.

While operation of the locking structure 10 and piston and cylinder structure 12 was considered in a particular sequence in which every step was separately controlled, it will be understood that a sequence of fewer controlled steps could have been used in operation. Thus, the piston 32 in an up position in FIG. 1 could be biased down under pressure so that after the piston 18 reaches a predetermined rightward position as shown in FIGS. 1 and 2, the locking piston would automatically assume the position shown in FIG. 3. Similarly, if bias pressure in a leftward direction is applied to the piston 18 on removal of the locking piston upward as shown in FIG. 1, the piston 18 will automatically move to the left. Either the separate sequencing requiring separate valves or the partially automatic sequencing requiring fewer valves may be accomplished with cylinder locking structure 110 and piston and cylinder structure 112.

Further, while one embodiment and a modification of the invention has been considered in detail, it will be understood that other embodiments and modifications of the invention are contemplated by the inventor. Thus, applicant's locking structure is not necessarily limited to piston and cylinder applications. Applicant's locking structure may be used to lock any axially movable member in a limiting position and in particular may be used in tool feed applications in conjunction with a tool feed slide. It is the intention to include all embodiments and modifications as are defined by the appended claims within the scope of the invention.

What I claim as my invention is:

1. In combination, a cylinder, a cylinder piston positioned within the cylinder for axial movement therein between a first and a second position, said cylinder piston including a piston rod connected thereto movable axially of the cylinder and a locking structure for releasably locking the piston in its first position, said locking structure comprising a housing, means for securing the housing to the cylinder, said housing having a first opening therethrough axially aligned with the piston rod when the housing is secured to the cylinder, a second opening through said housing extending transversely of the axis of the cylinder, means for passing an actuating medium into and out of the second opening of said housing, a cylindrical wedge member having a transverse slot extending approximately halfway through one side thereof, one side of which is a cam surface inclined with respect to the axis of the cylinder, means for securing the wedge member to the piston rod as an axial extension thereof, means for preventing rotation of said wedge member, a solid, cylindrical locking piston positioned within the transverse opening of said housing means for preventing rotation of said locking piston, said locking piston including a full cylindrical surface on each end thereof, sealing means surrounding the ends of the locking piston, a longitudinally extending and inclined recess in one side of the locking piston including a camming surface complementary to and engageable with the camming surface on the wedge member, a transversely extending slot at one end of the recess in said locking piston, said slot having a semicircular cross section for enabling the wedge member to be axially moved through the slot in one end position of the locking piston, said locking piston camming surface engaging the wedge member camming surface in another end position of the locking piston for preventing movement of said wedge member when in the first position, said axially extending and inclined cam surface on said locking piston extending transversely of the locking piston a distance approximately equal to the radius of the locking piston.

2. Structure as set forth in claim 1, wherein the means for preventing rotation of the locking piston includes slot and pin means operable between the locking piston and housing for permitting axial movement of the locking piston transversely of the cylinder piston while preventing angular movement of the locking piston about its own axis.

3. Structure as set forth in claim 1, and further including mechanical return means for the locking piston.

4. Structure as set forth in claim 1, wherein the piston and cylinder structure is double ended and the locking structure is positioned on one end of the cylinder.

5. Structure as set forth in claim 1, wherein the piston and cylinder structure is single ended and the locking structure is provided on the front end of the piston and cylinder structure.

6. Structure as set forth in claim 1, wherein the cam surfaces are at a locking angle with respect to the directional movement of the cylinder piston.

7. Structure as set forth in claim 1, wherein the means for preventing rotation of the wedge member includes key and keyway means operable between the wedge member and housing for permitting axial movement of the wedge member with the piston rod while preventing angular movement of the wedge member about the axis of the piston rod.

8. Structure as set forth in claim 1, and further including means operable between the cylinder and cylinder piston for preventing relative rotation therebetween.

9. Structure as set forth in claim 8, wherein the means operable between the cylinder and cylinder piston for preventing relative rotation therebetween comprises an elongated rod, the opposite ends of which are secured against movement relative to the cylinder piston, which elongated rod extends through the cylinder piston, and sealing means for sealing between the cylinder piston and rod.

10. Structure as set forth in claim 1, and further including means for separately extending the cylinder piston and then locking the cylinder piston in an extended position and for subsequently separately unlocking the cylinder piston and retracting the cylinder piston.

11. Structure as set forth in claim 1 and further including means for extending the cylinder piston and then automatically locking the cylinder piston in an extended position and for subsequently unlocking the cylinder piston and then automatically retracting the cylinder piston.

* * * * *